United States Patent
Hromatka et al.

[15] 3,669,959
[45] June 13, 1972

[54] THIENO-DIAZEPIN-ONES

[72] Inventors: Otto Hromatka; Dieter Binder, both of Vienna, Austria

[73] Assignee: Invag Aktiengesellschaft, Zurich, Switzerland

[22] Filed: Dec. 10, 1969

[21] Appl. No.: 884,020

[30] Foreign Application Priority Data

Dec. 10, 1968 Austria ..........................A 12016/68
Feb. 5, 1969 Austria ..........................A 1132/69

[52] U.S. Cl..........................260/239.3 B, 424/244, 424/275, 260/332.2 R
[51] Int. Cl...................................C07d 53/02, C07d 63/18
[58] Field of Search................................160/239.3

[56] References Cited

UNITED STATES PATENTS 3,558,606  1/1971  Tinney..............................260/239.3
3,371,085  2/1968  Reeder et al........................260/239.3

OTHER PUBLICATIONS

Burger " Medicinal Chemistry," 2nd Ed., (Interscience), (1960), pages 72–81

*Primary Examiner*—John D. Randolph
*Assistant Examiner*—Robert T. Bond
*Attorney*—Waters, Roditi, Schwartz & Nissen

[57] ABSTRACT

Thieno-diazepine derivatives of the formula

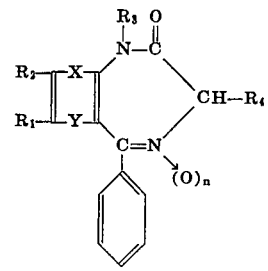

wherein one of the symbols X and Y is a direct carbon-to-carbon linkage and the other is a —S— group; $n$ is 0 or 1; $R_1$ is hydrogen, lower alkyl, aryl or trifluoromethyl; $R_2$ is hydrogen, lower alkyl, aryl, trifluoromethyl, halogen, nitro, lower alkoxy or $NR_5R_6$ in which $R_5$ and $R_6$ are independently selected from the group consisting of halogen, lower alkyl and acyl; $R_3$ is hydrogen, lower alkyl and when $n$ is 0, $R_4$ is a lower alkanoyloxy or hydroxy group; the symbols $R_5$ and $R_6$ being lower alkyl or acyl or one of them being hydrogen and the other acyl when $n$ is 1 or when $R_4$ is a lower alkanoyloxy or hydroxy group and the acid addition salts thereof are useful as muscle relaxants and/or sedatives (tranquilizers).

19 Claims, No Drawings

THIENO-DIAZEPIN-ONES

DETAILED DESCRIPTION OF THE INVENTION

This invent-on relates to diazepine derivatives and in particular to thieno-diazepine derivatives having the formula:

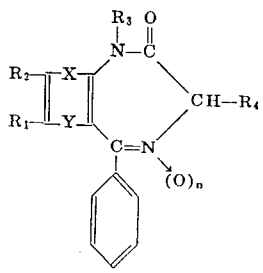

I one of the symbols X and Y is a direct carbon-to-carbon linkage and the other one is an —M S— group; $n$ is 0 or 1; $R_1$ is hydrogen, lower alkyl, aryl or trifluoromethyl; $R_2$ is hydrogen, lower alkyl, aryl, trifluoromethyl, a halogen, a nitro, lower alkoxy or —$NR_5R_6$, in which $R_5$ and $R_6$ are halogen, lower alkyl or acyl; $R_3$ is hydrogen, lower alkyl or a lower cycloalkyl-alkyl and $R_4$ is hydrogen, lower alkyl, or, when $n$ is 0, a lower alkanoyloxy- or hydroxy- group, the symbols $R_5$ and $R_6$ being lower alkyl or acyl or one of them being hydrogen and the other one acyl, when $n$ is 1 or when $R_4$ is a lower alkanoyloxy or hydroxy group and the acid addition salts thereof.

Where used herein, the expression "lower alkyl" shall be understood as indicating a straight or branched chain saturated hydrocarbon group having one to seven, preferably one to four, carbon atoms, such as, e.g., methyl, ethyl, n-propyl or isopropyl. Similarly, the expression "lower alkoxy group" indicates a straight or branched chain alkoxy group having one to seven, preferably one to four, carbon atoms, such as, e.g., methoxy, ethoxy or propoxy. The expression "acyl" designates a residue derived from an organic acid by means of separating therefrom the hydroxy group, such as, e.g., an alkanoyl group including at most seven, and preferably at most four carbon atoms, as e.g. an acetyl or propionyl group. The expression "alkanoyl group" refers to an alkanoyl group linked by an oxygen atom, as e.g. to an acetoxy group. Unless otherwise indicated, the term "halogen" is to be understood as designating the four halogens, namely fluorine, chlorine, bromine and iodine.

The expression "lower cycloalkyl-alkyl" as used herein, designates a lower alkyl group which has been substituted by a cycloalkyl group having three to six carbon atoms, such as, e.g., cyclopropyl methyl group.

Among the compounds embraced by the above general formula I, the preferred compounds are those wherein $R_1$ is hydrogen. Particularly preferred among them are the compounds corresponding to general formula I wherein $R_1$ is hydrogen, $R_2$ is hydrogen, methyl, a nitro group or a halogen (in particular chlorine), the symbols X being —S— and Y being indicative of a direct carbon-to-carbon linkage, or wherein $R_1$ is hydrogen, $R_2$ is hydrogen or a nitro group, X indicating a direct linkage and Y corresponding to —S—. For $R_4$, hydrogen is particularly preferred, while $R_3$ is preferably hydrogen, methyl or cyclo-propyl-methyl.

The foregoing makes it clear that among the compounds covered by the general formula I there are certain preferred members, especially those in which all the substituents have the aforementioned preferred significance. Typical representatives of particularly preferred compounds are the following:

1,3-dihydro-5-phenyl-2H-thieno [2,3-e]-1,4-diazepin-2-one,
7-chloro-1,3-dihydro-5-phenyl-2H-thieno[2,3-e]-1,4-diazepin-2-one,
1,3-dihydro-7-nitro-5-phenyl-2H-thieno[2,3-e]-1,4-diazepin-2-one,
1,3-dihydro-1-methyl-7-nitro-5-phenyl-2H-thieno[2,3-e]-1,4-diazepin-2-one,
1,3-dihydro-1-methyl-5-phenyl-2H-thieno[2,3-e]-1,4-diazepin-2-one,
7-chloro-1,3-dihydro-1-methyl-5-phenyl-2H-thieno-[2,3-e]-1,4-diazepin-2-one,
1,3-dihydro-5-phenyl-2H-thieno[2,3-e]-1,4-diazepin-2-one-oxide,
1,3-dihydro-5-phenyl-2H-thieno[3,2-e]-1,4-diazepin-2-one,
1,3-dihydro-8-nitro-5-phenyl-2H-thieno[3,2-e]-1,4-diazepin-2-one,
1,3-dihydro-8-nitro-5-phenyl-2H-thieno[3,2-e]-1,4-diazepin-2-one,
1,3-dihydro-1-methyl-85-phenyl-2H-thieno[3,2-e]-1,4-diazepin-2-one,
1,3-dihydro-5-phenyl-2H-thieno[3,2-e]-1,4-diazepin-2-one-4-oxide,
1,3-dihydro-7-methyl-5-phenyl-2H-thieno[2,3-e]-1,4-diazepin-2-one,
1-cyclopropylmethyl-1,3-dihydro-5-phenyl-2H-thieno-[3,2-e]-1,4-diazepin-2-one.

The compounds of the general formula I and their acid addition salts may be prepared according to this invention by the following processes:

a. When preparing a compound of the general formula I in which $n$ is 0, $R_4$ is hydrogen or a lower alkyl and X, Y, $R_1$, $R_2$ and $R_3$ are as defined above, there is carried out cyclization of a compound having the general formula

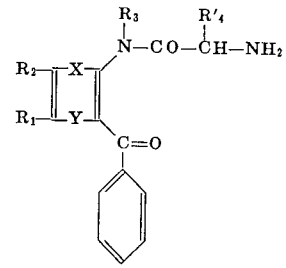

II wherein X, Y, $R_1$, $R_2$ and $R_3$ are as defined above and $R_4$ is hydrogen or a lower alkyl.

b. When preparing a compound of the general formula I in which one of $R_1$ and $R_2$ are hydrogen, lower alkyl, aryl or trifluoromethyl, and the other is a halogen or a nitro group, and wherein X, Y, $R_3$ and $R_4$ and $n$ are as defined above, there is halogenated or nitrated a compound corresponding to the general formula I in which no substitution exists in the thiophene ring or which has been substituted in the thiophene ring by a lower alkyl, aryl or trifluoromethyl group.

c. When preparing a compound of the general formula I in which one of $R_1$ and $R_2$ is hydrogen, a lower alkyl, aryl or trifluoromethyl, and the other is an amino group, X, Y, $R_3$, $R_4$ and $n$ being as defined above, there is reduced the corresponding nitro compound of the general formula I or the 4-oxide derived therefrom.

d. When preparing a compound of the general formula I wherein $n$ is 0, one of the symbols $R_1$ and $R_2$ is hydrogen, a lower alkyl, aryl or trifluoromethyl, and the other is an —$NR_5R_6$ group wherein $R_5$ and $R_6$ are as defined above, in which, however at most only one of them is hydrogen, and further wherein X, Y, $R_3$ and $R_4$ are as defined above, there is alkylated or acylated the corresponding amino compound of formula I, in which $R_5$ and/or $R_6$ are hydrogen.

e. When preparing a compound of the general formula I, in which one of $R_1$ and $R_2$ is hydrogen, a lower alkyl, aryl or trifluoromethyl group and the other is a halogen or to a lower alkoxy group, $n$ being 0, and wherein X, Y, $R_3$ and $R_4$ are as defined above, there is converted the corresponding amino compound of formula I into a diazonium salt which is then converted into the corresponding halogen or alkoxy compound.

f. When preparing a compound of the general formula I, wherein $R_3$ is a lower alkyl or for cyclo-alkyl-alkyl and wherein X, Y, R₁, R₂, R₄ and *n* are as defined above, the corresponding 1-unsubstituted compound of the general formula I is N₁-alkylated or N₁-cyclo-alkyl-alkylated.

g. When preparing a compound of the general formula I, in which *n* is 1, and X, Y, R₁, R₂, R₃ and R₄ are as defined above, there is oxidized the compound corresponding to the general formula I, wherein *n* is 0.

h. When preparing a compound of the general formula I, in which *n* is 0; R₄ is a lower alkanoyloxy group and X, Y, R₁, R₂ and R₃ are as defined above, there is reacted a corresponding compound of formula I wherein *n* is 1 and R₄ is hydrogen with an anhydride or a halide of an aliphatic carboxylic acid.

i. When preparing a compound of the general formula I, in which *n* is 0, R₄ is a hydroxy group, and X, Y, R₁, R₂ and R₃ are as defined above, there is hydrolyzed a corresponding compound having the general formula I, wherein R₄ is a lower alkanoyloxy group.

k. When preparing a compound of the general formula I, wherein X, Y, R₁, R₂, R₃ and R₄ are as defined above, and *n* is 0, or in which R₅ and R₆ are either hydrogen or a lower alkyl, there is treated the corresponding base with an acid.

According to one aspect of these processes, there are obtainable compounds having the general formula I, wherein *n* is 0, R₄ is hydrogen or a lower alkyl group and the remaining symbols are as defined above if cyclization of a compound having the general formula II is effected; as e.g. when there are cyclized the compounds falling under said general formula II, as for instance 2-amino-acetylamino-3-benzoylthiophene, 2-aminoacetylamino-3-benzoyl-5-chlorothiophene, 3-aminoacetylamino-2-benzoyl-thiophene and the like, in a manner such that one of the reactants is dissolved first under reaction conditions in an inert organic solvent, after which the obtained solution is heated under reflux until it is fully cyclized.

The reaction time depends on the reaction temperature which itself is determined by the solvent used. Appropriate solvents applicable thereto are for instance lower alkanols, such as methyl or ethyl alcohol and the like, ethers such as tetrahydrofuran, dioxane, ethyleneglycol dimethyl ether and the like, amides, such as diethylformamide or dithylformamide etc.

According to a second aspect of these processes, there are obtainable compounds generally corresponding to the general formula I, in which one of the symbols R₁ and R₂ is hydrogen, a lower alkyl, aryl or trifluoromethyl group and the other is a halogen or a nitro group, while the remaining symbols are as defined above, if halogenation or nitration is carried out of a corresponding compound falling under the general formula I wherein the thiophene ring is unsubstituted or monosubstituted by a lower alkyl, aryl or trifluoromethyl group. In the case where the starting material is a compound of the general formula I having its thiophene ring unsubstituted, the halogenation or the nitration is carried out, as a general rule, in a manner such that the carbon atom adjacent the symbol X is substituted, so that there is obtained as the reaction product a compound corresponding to the general formula I, wherein R₁ is hydrogen and R₂ is halogen, or a nitro group.

A typical example of the halogenation within the framework of the second aspect of the process is the conversion of 1,3-dihydro-5-phenyl-2H-thieno[2,3-e]-1,4-diazepin-2-one, into 7-chloro-1,3-dihydro-5-phenyl-2H-thieno[2,3-e]-1,4-diazepin-2-one. The halogenation is carried out according to methods usually used for halogenating thiophenic compounds, as e.g. by the use of elemental chlorine, bromine or iodine, or by sulphuryl chloride etc. The reaction conditions are determined by the nature of the halogenating means. Thus, the chlorination by the use of elemental chlorine takes place for instance in chloroform/pyridine under ambient or slightly elevated temperature, while in the case of chlorination by means of sulphuryl chloride the process is carried out for instance in chloroform under reflux temperature.

Typical examples of nitration within the framework of the disclosed process is the conversion of 1,3-dihydro-5-phenyl-2 H-thieno[2,3-e]-1,4-diazepin-2-one into 1,3-dihydro-7-nitro-5-phenyl-2H-thieno-[2,3-e]1,4-diazepin-2-one, the conversion of 1,3-dihydro-5-phenyl-2H-thieno-[3,2-e]-1,4-diazepin-2-one into 1,3-dihydro-8-nitro-5-phenyl-2H-thieno[3,2-e]-1,4-diazepin-2-one and the conversion of 1,3-dihydro-1-methyl-5-phenyl-2H-thieno[2,3-e]-1,4-diazepin-2-one into 1,3-dihydro-1-methyl-7-nitro-5-phenyl-2H-thieno-[2,3-e]-1,4-diazepin-2-one. When the basic material from which the reaction starts is a thieno[2,3-e]-1,4-diazepin-derivative, i.e. where X = —S—, and Y = a direct C—C linkage, then the exclusive final product obtainable is the desired mono-nitro-compound. In the case of reacting as the basic starting material, a thieno[3,2-e]-1,4-diazepin derivative, i.e. where X = a direct C—C linkage, and Y = —S—, there is obtained at most, a by-product having a second nitro group which by-product may be thereafter separated from the desired mono-nitro-compound according to well known methods as e.g. through crystallization. The nitration is performed in the usual way by the use of nitric acid or of an alkali nitrate and sulphuric acid, the process being carried out in a manner such that the starting material is dissolved in concentrated sulphuric acid, whereafter the solution obtained is slowly reacted with a mixture of concentrated nitric acid ($d.$ = 1.42) and concentrated sulphuric acid. As a general rule, the preferred temperature is between −10° and +10° C. which has an advantageous effect on the nitration process.

According to a further aspect of the process, a compound having the general formula I in which one of R₁ and R₂ is hydrogen, a lower alkyl, aryl or trifluoromethyl and the other is an amino group, and wherein the remaining symbols are as defined above may be obtained by the reduction of the corresponding nitro compound or its 4-oxide derivative. This results in reduction not only of the nitro group but also of the 4-oxide function.

Compounds of the general formula I in which *n* is 0, one of R₁ and R₂ is hydrogen, a lower alkyl, aryl or trifluoromethyl, while the other is an NR₅R₆, wherein R₅ and R₆ are as defined above except that only one of them is hydrogen, while all the other symbols are as defined above may be obtained according to a further aspect of the process when the corresponding amino compound of the general formula I, wherein R₅ and/or R₆ is hydrogen, is submitted to alkylation and/or acylation. In doing so, there is used in the role of alkylating agent e.g. an alkyl halide, as for instance methyl iodide, ethyl iodide or propyl iodide; a dialkylsulphate, as for instance dimethylsulphate and the like, and as the acylating agent e.g. a halide or anhydride of an aliphatic acid, as for instance acetyl chloride, propionyl chloride or acetic anhydride and the like.

According to yet another process aspect, there is obtainable a compound falling within the general formula I in which one of R₁ and R₂ is hydrogen, lower alkyl, aryl or trifluoromethyl, while the other one is a halogen or a lower alkoxy group, and wherein *n* is 0 and the remaining symbols are as defined above, when the corresponding amino compound is reacted so as to obtain from it a diazonium salt and when thereafter this diazonium salt is transformed by the use of known methods, as e.g. by cuprochloride, cuprobomide potassium chloride and the like, into the corresponding halogen or alkoxy compound.

Compounds corresponding to the general formula I, in which R₅ is alkyl or cycloalkylalkyl and the remaining symbols are as defined above, may be obtained by alkylating the corresponding compounds which are unsubstituted in the 1-position, the alkylation being carried out as an N₁-alkylation or as an N₁-cycloalkylalkylation. This alkylation procedure is performed with a special advantage in a manner such that the starting material from which the process begins and wherein the 1-position is unsubstituted is first converted into an alkali salt, as e.g. by the use of an alkali metal alkoxide, such as, for instance, sodium methylate, whereupon the reaction product is treated in an appropriate polar solvent, such as dimethyl formamide with one of the hereinabove mentioned alkylating agents or by a cycloalkylalkylhalide.

The production of compounds of the general formula I, in which n is 1 and the remaining symbols are as defined above may be carried out by oxidation of the corresponding compounds of the general formula I wherein n is 0. In the process, use is made of an oxidizer, e.g., a peracid, such as perbenzoic acid, m-chlorperbenzoic acid and the like. THe reaction conditions naturally depend on the oxidizer used.

According to a further aspect of the process, compounds of the general formula I, in which n is 0, $R_4$ is a lower alkanoyloxy group and the remaining symbols are as defined above, may be obtained by reacting a corresponding compound of the general formula I, wherein n is 1 and $R_4$ is hydrogen, with an anhydride or a halide of an aliphatic carboxylic acid. This kind of process excludes the presence of an oxygen atom in the 4-position and substitutes the unsubstituted carbon atom in the 3-position of the starting by an alkanoyloxy group. There are used as acid chlorides or acid anhydrides, for instance acetyl chloride, propionyl chloride, acetic anhydride and the like. The reaction is carried out in an inert organic solvent, such as dimethyl formamide, pyridine and the like. Whenever use is made of an acid anhydride, the same can simultaneously be used as the reaction medium.

Compounds of the general formula I, in which n is 0, $R_4$ is a hydroxy group and the remaining symbols are as defined above, are obtainable hydrolyzing the corresponding compounds having the general formula I, in which $R_4$ is a lower alkanoyloxy group. This hydrolysis is carried out according to generally known methods, e.g. under acidic conditions.

Compounds of the general formula I, wherein a is 0 and/or $R_5$ and $R_6$ are either hydrogen or a lower alkyl, are obtainable by reacting same with inorganic or organic acids to convert them to the corresponding salts, in particular to pharmaceutically acceptable salts. So for instance, use may be made of acids leading to pharmaceutically usable salts, such as hydrochloric acid, hydrobromic acid, sulphuric acid, acetic acid, maleic acid, methansulphuric acid etc.

The preparation of the compounds corresponding to the general formula II which are used as starting materials may be carried out in conformity with the following reaction scheme which is set forth herein by way of example. Said scheme represents the case wherein, in formula II, $R_1$, $R_2$ and $R_3$ are hydrogen, as follows:

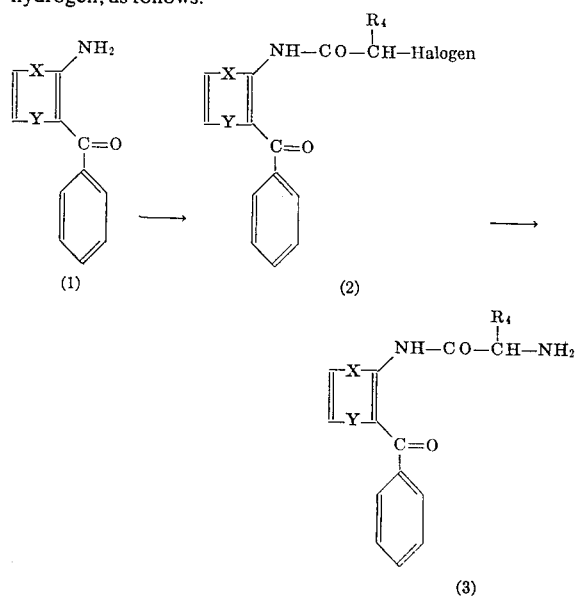

The compound illustrated by the formula (1), in which X is —S— and Y is a direct carbon to carbon linkage is a well known one. In the case where X is a direct linkage and Y is —S—, the reaction product is obtained from 2-methyl-4H-thieno[3,2-e]oxazine-4-one through reaction with a phenylmagnesium halide and a subsequent hydrolysis of the produced 3-acetylamino-2-benzoylthiophenes.

Thereafter, the compound of the above formula (1) is reacted with an α-halocarboxylic acid halide of the formula Hal—CO—CH($R_4$)—Hal, such as e.g. chloroacetyl chloride. The resulting compound corresponding to the above formula (2) may be directly converted by the use of ammonia into a corresponding compound of the above formula (3). Whenever the Hal-group of formula (2) is not iodide, the corresponding iodine compound may first be prepared by means of sodium iodide, as e.g. in the so called Finkelstein reaction, which is then converted by reacting same with ammonia to the corresponding compound having the formula (3).

Where it is desired to prepare a compound of the general formula II in which $R_1$ and/or $R_2$ and/or $R_3$ are other than hydrogen, one starts, depending on the nature of the required substituents, from the corresponding substituted derivatives of compound (1), and the required substituents are introduced in one of the following stages according to generally known methods, or conversion is carried out in other substituents. So for instance, one may obtain 2-amino-acetylamino-3-benzoyl-5-chloro-thiophene if 2-amino-3-benzoyl-thiophene is acylated with chloroacetyl chloride, the resulting product being thereafter 3-benzoyl-2-chloro-acetylaminothiophene. This product is then chlorinated by sulphuryl chloride to convert same to 3-benzoyl-3-chloro-2-chloroacetylamino-thiophene. This thiophene is then treated with sodium iodide to be converted into 3-benzoyl-5-chloro-2-iodoacetylamino-thiophene which product is thereafter reacted with ammonia.

The compounds of formula I are useful as muscle relaxation agents and sedatives (tranquilizers). For example, the compound: 7-chloro-1,3-dihydro-1-methyl-5-phenyl-2H-thieno[2,3-e]-1,4-diazepin-2-one in a test on a rotating rod using a mouse an $ED_{50}$ of 50 mg/kg p.o. was observed. In a further test in an ethyl alcohol potentiating experiment using a mouse, an $ED_{50}$ of 40 mg/kg p.o. was observed, and in a test in a barbiturate potentiating experiment on a rat, an $ED_{50}$ of 42 mg/kg p.o. was found. In an examination of acute toxicity in a mouse, an $LD_{50}$ of between 1,250 and 2,500 mg/kg p.o. was observed. Similarly, the compound: 7-chloro-1,3-dihydro-5-phenyl-2H-thieno[2,3-e]-1,4-benzo-diazepin-2-one if submitted to an ethyl alcohol potentiating test proves to have an $ED_{50}$ of 40 mg/kg p.o., in a barbiturate potentiating test, an $ED_{50}$ of 21 mg/kg p.o., and in a toxicity test, an $LD_{50}$ of between 2,500 and 5,000 mg/kg p.o. The tests which have been alluded to hereinabove were effected according to generally known, standard methods.

The compounds of the general formula I, as well as their acid addition salts may be processed by generally known methods for being converted to pharmaceutical preparations, as e.g. in the form of tablets, dragees, suppositories, capsules, solutions, suspensions, emulsions and the like. Such preparations contain the usually used pharmacologically inert carrying materials, as e.g. milk sugar, starch, talcum, magnesium stearate, water, vegetable oil, polyalkylglycols etc., but they may be supplemented besides by preserving, stabilizing, and wetting agents or emulsifiers, by salts for changing osmotic pressure, buffers and whatever other materials may be therapeutically valuable. If necessary, said preparations may be sterilized or submitted to other operations applicable to the pharmaceutical industry.

An appropriate pharmaceutical dosing unit may contain about 1 to 500 mg of any one of the compounds of the present invention. Appropriate daily doses for peroral reception by mammals are within the limits of approximately 0.1 mg/kg up to approximately 300 mg/kg. For parenteral administration to mammals, the appropriate dose for one day amounts to between 0.1 mg/kg and 10 mg/kg. These doses are however stated as examplary only. The specific does must be adjusted in each case to individual needs.

The following examples illustrate the invention. All the temperatures are indicated in degrees centigrade.

EXAMPLE 1

26.7 g of 2-aminoacetylamino-3-benzoyl-thiophene is boiled in 800 ml of absolute alcohol for 15 hours under reflux conditions, whereafter the solution is heated with activated carbon, for a further 10 minutes, and filtrated; and the resulting filtrate is evaporated in vacuum. The crystalline residue is then digested with the use of cold ethyl alcohol, filtered once more and washed twice with cold ethyl alcohol. From this filtrate, is obtainable colorless crystals of 1,3-dihydro-5-phenyl-2H-thieno[2,3-e]-1,4-diazepin-2-one, which after having been recrystallized from ethyl acetate, melt at 203°.

The starting material may be prepared as follows: 31.14 g of 2-amino-3-benzoyl-thiophene dissolved in 250 ml of absolute dioxane are reacted with 32.0 g of annealed potassium carbonate and under continuous stirring, 42.0 ml of chloroacetyl chloride are poured in. The resulting solution thus obtained becomes warmer, it is stirred for 2 hours and poured thereafter into 3 liters of saturated soda solution. After three hours, the deposited crystals are filtered, rinsed with water and dried. The resulting, colorless 3-benzoyl-2-chloroacetylamino-thiophene melts, after having been recrystallized from ethyl alcohol, at 150.5 to 151° C. The product thus obtained may be introduced into the second stage of the process without any necessity of its being purified.

42.5 g of said 3-benzoyl-2-chloroacetylamino-thiophene are boiled in 400 ml of acetone together with 25.8 g of sodium iodide for 45 minutes under reflux conditions. The solution thus obtained is evaporated in vacuo and the residue is introduced into a mixture of methylene chloride and water. From the organic phase there results crude 3-benzoyl-2-iodoacetylamino-thiophene which need not be separately purified and may be submitted to further treatment. The colorless crystals melt after having been recrystallized from ethyl alcohol at 142° to 144°.

54.4 g of 3-benzoyl-2-iodoacetylamino-thiophene are dissolved and boiled in 600 ml of methylene chloride and 530 ml of liquid ammonia for 4 hours, being interruptedly stirred and refluxed. The product thus obtained is thereafter evaporated in vacuo to a volume of 300 ml, made to react with three volumes of ether and extracted repeatedly with 0.5N hydrochloric acid. The combined aqueous phases are back extracted with ether for the purpose of purification and neutralized with sodium bicarbonate. Between pH 1 and 3, there separates an oily 2-aminoacetylamino-3-benzoyl-thiophene-hydrochloride which is transformed by addition of sodium bicarbonate into the corresponding crystalline free base. The resulting yellow fine needles melt, after having been recrystallized from methyl alcohol, at 145° to 147° C.

The product may then be further processed without being additionally purified.

EXAMPLE 2

4.7 g of 2-aminoacetylamino-3-benzoyl-5-chloro-thiophene are boiled in 250 ml of absolute ethyl alcohol and 0.3 ml of anhydrous formic acid for 2 hours under reflux conditions. Thereafter, activated carbon is added, the boiling is continued for a further 15 minutes, whereafter the mixture is filtrated and evaporated to eliminate ethyl alcohol in vacuo. The residue is 7-chloro-1,3-dihydro-5-phenyl-2H-thieno[2,3-e]-1,4-diazepin-2-one- which is recrystallized from ethyl alcohol and which melts at 250° to 252° C.

The starting material may be prepared by the following process:

Seventy grams of 3-benzoyl-2-chloroacetylamino-thiophene are dissolved in 500 ml of absolute chloroform and, under constant stirring, reacted with 25 ml of sulphuryl chloride which is added dropwise. After addition of approximately one half of said amount of sulphuryl chloride, the evolution of gases commences, whereupon the solution starts getting warmer. The remaining sulphuryl chloride is then quickly dropped in during which operation the mixture foams slightly. The mixing is then continued for one hour and the mixture is brought to dryness in vacuum wherein it is vaporized. The residue is then shaken out in water, filtered, washed through and recrystallized from ethyl alcohol. The resulting product is 3-benzoyl-5-chloro-2-chloroacetylamino-thiophene melting at 127° to 129° C.

Sixty three grams of 3-benzoyl-5-chloro-2-chloroacetylamino-thiophene, dissolved in 500 ml of pure acetone, are boiled under reflux conditions with 34 g of sodium iodide for 1 hour. Thereafter the acetone is distilled away, the residue then being repeatedly boiled with methylene chloride is distilled away. The residue which is 3-benzoyl-5-chloro-2-iodoacetyl-amino-thiophene is thereafter recrystallized from ethyl alcohol. It melts at 114° to 116° C.

Sixty nine grams of 3-benzoyl-5-chloro-2-iodoacetylamino-thiophene are dissolved in 760 ml of methylene chloride. The solution is colled to a temperature of −40° and then reacted with 670 ml of liquid ammonia. The resulting mixture is thereafter boiled for 4 hours at −26.5° under reflux, after which it is concentrated in vacuum at a temperature below zero to reduce the volume to an amount of 300 ml which is then reacted with one liter of ether. The etheric solution which is obtained is then shaken with one liter of 0.5N hydrochloric acid, so that there results a solid sediment which is filtered away. The aqueous phase of said filtrate is separated, shaken with ether and alkalized by pouring in a potassium carbonate solution. The resultant product is extracted by the addition of methylene chloride. The resulting organic phase is then dried and evaporized, the residue being crude 2-aminoacetylamino-3-benzoyl-5-chloro-thiophene. This product may be further processed without any preliminary purification. If this product is recrystallized from methylene chloride, there is obtained a pure product having a melting point of 148.5° to 149.5° C.

EXAMPLE 3

5.0 g of 3-aminoacetylamino-2-benzoyl-thiophene are boiled, dissolved in 150 ml of absolute ethyl alcohol, for 3 hours under reflux conditions. Thereafter, the resulting mixture is concentrated in vacuum to a small volume, whereafter it is left to crystallize. A filtration results in obtaining 1,3-dihydro-5-phenyl-2H-thieno[3,2-e]-1.4-diazepin-2-one in needlelike form melting at 205° to 206° C.

The starting material may be prepared in the following manner:

To a solution of 49.5 g of 2-methyl-4H-thieno[3,2-e]oxazine-4-one prepared in 610 ml of absolute benzene, and 305 ml of absolute ether, there is added dropwise over 3 hours, at a temperature of 5° to 7°, a mixture of phenyl magnesium bromide prepared from 47.1 g of bromobenzene and 7.3 g of magnesium chips dissolved in 50 ml absolute ether. After the addition has been terminated, the resulting mixture is further stirred for 1 hour at 5° and an additional 15 hours at ambient (room) temperature. Thereafter, said solution is cooled down to 0° and 305 ml of 2N hydrochloric acid are slowly added thereto in a manner such that the temperature does not exceed +3°. Then, stirring is further performed at ambient temperature for 20 minutes, the mixture then being filtered and the phases separated. The organic phase is repeatedly evaporated after being shaken with 2N caustic soda. The crystalline residue is boiled dissolved in 550 ml cyclohexane, filtered hot, and the resulting filtrate is vaporized, while the residue is boiled dissolved in 600 ml of ethyl alcohol and 600 ml of semiconcentrated hydrochloric acid for four hours under reflux conditions. After this, activated carbon is added, filtration is carried out, and vaporization is effected in vacuum, the residue being taken up with ether. The resulting etheric solution is repeatedly shaken with 2N hydrochloric acid and then vaporized, whereafter the remaining residue is 3-amino-2-benzoyl-thiophene. The yellow crystals melt, after being recrystallized from ethyl alcohol, at 103° C.

13.2 g of 3-amino-2-benzoyl-thiophene are dissolved in 120 ml of absolute dioxane and thereafter reacted with 13.0 g of potassium carbonate. To the reaction product there is then added dropwise under constant stirring, 18 ml of chloroacetyl chloride. The solution thus obtained becomes slightly warmer, it is stirred continuously for 3 hours and then poured into excess potassium carbonate solution. There, a crystalline product is precipitated, this product being then removed, washed with water and recrystallized from ethyl alcohol. The resulting product is 2-benzoyl-3-chloroacetyl-amino-thiophene in the form of colorless crystals melting at 132° to 134° C.

11.0 g of said 2-benzoyl-3-chloroacetylamino-thiophene and 6.2 g of sodium iodide are then boiled in 90 ml of acetone for 50 minutes under reflux conditions. The mixture is evaporated in vacuum, the residue is taken up in methylene chloride/water, the phases are mutually separated and the organic phase is evaporated. The crystalline product thus obtained is recrystallized from ethyl alcohol and is thereby transformed to the final product which is 2-benzoyl-3-iodoacetyl-amino thiophene in the form of colorless crystals melting at 105° to 107°.

12.8 g of this 2-benzoyl-3-iodoacetylamino thiophene are dissolved in 144 ml of methylene chloride and 126 ml of liquid ammonia and boiled for 5 hours under reflux conditions. This done, the solution is concentrated under vacuum to 50 ml. The methylene chloride solution is washed with water and then vaporized, the residue resulting therefrom is 3-aminoacetylamino-2-benzoyl-thiophene which is shaken out with methylene chloride/petroleum ether. The resulting product is in the form of yellow needles melting at 124° to 127° C.

EXAMPLE 4

7.3 g of 1,3-dihydro-5-phenyl-2H-thieno[2,3-e]-1,4-diazepin-2-one are dissolved in 65 ml of anhydrous chloroform and 11 ml of pyridine, thereafter, gaseous chlorine is added in the amount of 2.26 g at 30° – 35°. The thus prepared mixture is left standing for 2 hours. Then said solution is repeatedly shaken out with 2N hydrochloric acid, thereafter being neutralized after the aqueous phases are combined through addition of sodium bicarbonate and filtered to separate fine colorless crystals. After they have been recrystallized several times from ethyl alcohol, the resulting product is obtained which is 7-chloro-1,3-dihydro-5-phenyl-2H-thieno[2,3-e]-1,4-diazepin-2-one melting with decomposition at 250° to 252° C.

EXAMPLE 5

Ninety grams of 1,3-dihydro-5-phenyl-2H-thieno[2,3-e]-1,4-diazepin-2-one are dissolved in 3 liters of absolute chloroform, whereafter the obtained solution is reacted with 36.1 ml of sulphuryl chloride added in drops during one hour. The solution is heated for 15 minutes until it starts boiling, then there is added sulphuryl chloride in an amount of 4 ml, and the solution is once more boiled for 15 minutes, this operation being subsequently repeated once more. After cooling off, the solution is shaken out with a bicarbonate solution, which operation results immediately in the formation of crude 7-chloro-1,3-dihydro-5-phenyl-2H-thieno[2,3-e]-1,4-diazepin-2-one. This product is filtered, after which the filtrate is separated in a separating funnel and the organic phase is vaporized after drying. The residue is then boiled with 400 ml of methylene chloride and the precipitated crystals are filtered off, so that a further portion of the above product is obtained.

The compound thus obtained is recrystallized from ethyl alcohol. The consequent final product melts at 258° to 259° with decomposition.

EXAMPLE 6

5.25 g of 1,3-dihydro-5-phenyl-2H-thieno[2,3-e]-1,4-zepin-2-one are introduced under constant stirring at a temperature of 0° into 25 ml of concentrated sulphuric acid. The obtained mixture is cooled to −10° and at this temperature there is added thereto over 25 minutes, dropwise, and under constant stirring, as a reactant, a mixture prepared from 1.45 ml of nitric acid $d=1.42$; and 2.3 ml of concentrated sulphuric acid. After 25 minutes of continued stirring at a temperature of 0° to −5°, the dark green reaction solution is poured into 400 ml of freezing water, which procedure leads to the separation of the otherwise difficulty soluble sulphate. Thereafter, neutralization is carried out using soda which causes the conversion of sulphate into the free crystalline base. The crystalline 1,3-dihydro-7-nitro-5-phenyl-2H-thieno[2,3-e]-1,4-diazepin-2-one is then filtered off and recrystallized from ethyl alcohol. There are obtained lightly yellowish plates melting with decomposition at a temperature of 266° to 268° and browning at 200°.

EXAMPLE 7

2.42 g of 1,3-dihydro-5-phenyl-2H-thieno[3,2-e]-1,4-diazepin-2-one are introduced, at a temperature of 0° under continued stirring slowly into 13 ml of concentrated sulphuric acid. The thus prepared solution is cooled down to −10°, whereafter, over a 15 minute period, a mixture prepared from 0.65 ml of nitric acid $d=1.42$; and 1.3 ml of concentrated sulphuric acid is added dropwise. The stirring is then continued for the following 40 minutes at a temperature of −4° to 0°, whereafter the solution is poured out into 300 ml of freezing water and neutralized with sodium bicarbonate. The deposited crystals are filtered off, washed with water and, under addition of activated carbon, recrystallized from ethyl alcohol. The substance thus obtained is 1,3-dihydro-8-nitro-5-phenyl-2H-thieno[3,2-e]-1,4-diazepin-2-one which starts getting brown at 180° and melts with decomposition at 215°.

EXAMPLE 8

41.9 g of 1,3-dihydro-1-methyl-5-phenyl-2H-thieno[2,3-e]-1,4-diazepin-2-one are stirred at 0° while being dissolved in concentrated sulphuric acid. Thereafter, dropwise, and over a 30-minute period at a temperature of −10°, a nitrating acid is added which is prepared from 10.7 ml of nitric acid, $d=1.42$; and 17.5 ml of concentrated sulphuric acid. The thus obtained solution is stirred for 10 minutes at a temperature of −10° and thereafter at 0° to −5° for 1 hour. The resulting mixture is then poured out into 10 l of freezing water, neutralized by addition of sodium bicarbonate solution and shaken out repeatedly with methylene chloride to precipitate out a crystalline product. The dried organic phase obtained is then vaporized to separate therefrom 1,3-dihydro-1-methyl-7-nitro-5-phenyl-2H-thieno[2,3-e]-1,4-diazepin-2-one. This is then recrystallized from ethyl alcohol and dioxane. It melts at 195° to 197° C.

The raw material from which this reaction starts may be prepared in the procedure described in example 9 which follows.

EXAMPLE 9

3.0 g of 1,3-dihydro-5-phenyl-2H-thieno[2,3-e]-1,4-diazepin-2-one are first dissolved in 13 ml of a methyl alcohol solution of sodium methylate. The resulting solution is then vaporized in vacuum to dryness, whereafter, the resulting residue is taken up with 20 ml of absolute dimethyl formamide which enables the separation of the sodium salt of 1,3-dihydro-5-phenyl-2H-thieno[2,3-e]-1,4-diazepin-2-one. Then 1.8 g of methyl iodide are added to the mixture. This mixture gets then slightly warmer in changing to a clear solution. This solution, left standing over 2 hours in vacuum, becomes concentrated, and is thereafter reacted with water and shaken out several times with methylene chlride. The obtained organic phase is shaken with 0.5N caustic soda and consequently rinsed, dried and vaporized. The residue is then recrystallized by being reacted with a small amount of ether. As a result, there is obtained 1,3-dihydro-1-methyl-5-phenyl-2H-thieno[2,3-e]-1,4 diazepin-2-one in the form of colorless crystals which are then recrystallized from ethyl alcohol. It melts at 136° to 137.5°.

EXAMPLE 10

3.0 g of 1,3-dihydro-7-nitro-5-phenyl-2H-thieno[2,3-e]-1,4-diazepin-2-one are dissolved in 11 ml of a 1N methyl alcohol sodium methylate solution. The mixture thus obtained in vaporized under vacuum, the residue being then taken up in 15 ml of absolute dimethyl formamide, reacted with 0.7 ml of methyl iodide and left to stay overnight. Thereafter, concentration is carried out in vacuum, the obtained solution then being diluted with water and the precipitated solid product is shaken out with methylene chloride. The resulting organic phase is then repeatedly shaken out with 0.5N of caustic soda, then washed and vaporized, the resulting material being 1,3-dihydro-1-methyl-7-nitro-5-phenyl-2H-thieno[2,3-e]-1,4-diazepin-2-one. This is several times recrystallized from ethyl alcohol or ethyl acetate. The result is a yellowish mass of crystals having a melting point of 195° to 196.5°.

EXAMPLE 11

1.5 g of 7-chloro-1,3-dihydro-5-phenyl-2H-thieno[2,3-e]-1,4-diazepin-2-one are first dissolved in 5.7 ml of 1N methyl alcohol sodium methylate solution. The resulting solution is vaporized under vacuum, the residue being then taken up with 6 ml of absolute dimethyl formamide and reacted with 0.37 ml of methyl iodide. The mixture is then left to stand for 2 hours at ambient temperature and is then concentrated in vacuum, taken up with methylene chloride/water, then washed, dried and vaporized, thus causing the separation of crude 7-chloro-1,3-dihydro-1-methyl-5-phenyl-2H-thieno[2,3-e]-1,4-diazepin-2-one. This is then twice recrystallized from ethyl alcohol. The resulting substance is in the form of colorless crystals melting at 120° to 122°.

EXAMPLE 12

1.21 g of 1,3-dihydro-5-phenyl-2H-thieno[3,2-e]-1,4-diazepin-2-one are dissolved in 5.5 ml of 1N methanolic sodium methylate solution. The resulting solution is then vaporized in vacuum, the residue being taken up in 14 ml of dimethyl formamide and reacted with 0.61 ml of methyl iodide. Left standing at ambient temperature for two hours, the solution is concentrated in vacuum and taken up with water/methylene chloride. Then, the organic phase is separated, shaken out several times with 0.5N caustic soda and vaporized. There remains a crystalline sediment which is 1,3-dihydro-1-methyl-5-phenyl-2H-thieno[3,2-e]-1,4-diazepin-2-one. This is then recrystallized from ethyl alcohol and melts at 159.5° to 161°.

EXAMPLE 13

1.21 g of 1,3-dihydro-5-phenyl-2H-thieno[3,2-e]-1,4-diazepin-2-one are dissolved in 5.5 ml of 1N methyl alcoholic sodium methylate solution. The thus prepared solution is then vaporized in vacuum, the residue being subsequently taken up with 14 ml of dimethyl formamide and reacted with 0.61 ml of methyl iodide. After two hours, during which said solution was allowed to stand at ambient temperature, it is concentrated in vacuum and taken up with water/methylene chloride. The resulting phase is repeatedly shaken with 0.5N caustic soda and then repeatedly with 2N hydrochloric acid. The combined aqueous phases are then neutralized by application of sodium carbonate. There are precipitated crystals which are filtered off, washed with water and recrystallized with the addition of activated charcoal. The resulting substance is 1,3-dihydro-1-methyl-8-nitro-5-phenyl-2H-thieno[3,2-e]-1,4-diazepin-2-one melting at 184.5° to 186.5°.

EXAMPLE 14

0.5 g of 1,3-dihydro-5-phenyl-2H-thieno[2,3-e]-1,4-diazepin-2-one is dissolved in 15 ml of chloroform and then reacted with 23.0 ml of a solution prepared from 0.0041 mol of perbenzoic acid and chloroform. The resulting solution is left standing overnight and is then repeatedly shaken with saturated sodium bicarbonate solution. After this has been done, a small volume of this solution is vaporized, this giving rise to colorless crystals of 1,3-dihydro-5-phenyl-2H-thieno[2,3-e]-1,4-diazepin-2-one-4-oxide which are precipitated. After recrystallization from ethyl alcohol, the crystals obtained then become brown at 247° and melt at 260° to 264° with decomposition.

EXAMPLE 15

0.5 g of 1,3-dihydro-5-phenyl-2H-thieno[3,3-e]-1,4-diazepin-2-one are dissolved in 7 ml of chloroform and are then heated to 35° and reacted with 0.3 g of technical m-chloro-perbenzoic acid. The resulting reacted mixture is then left standing for 5 hours at ambient temperature and is then shaken with the addition of 30 ml of saturated sodium becarbonate solution. Then precipitated crystals are filtered off, washed with water and chloroform and recrystallized from ethyl alcohol. The resulting substance is 1,3-dihydro-5-phenyl-2H-thieno[3,2-e]1-4-diazepin-2-one-4-oxide in the shape of needle-like crystals which become brown at 260° and which melt at 266° to 270° with decomposition.

EXAMPLE 16

6.2 of 2-aminoacetylamino-3-benzoyl-5-methyl-thiophene boiled in 180 ml of absolute ethyl alcohol for 15 hours under reflux conditions. Thereafter, the solution is vaporized in vacuum, the residue taken up in ether and 2N hydrochloric acid. Then, the salt phase is neutralized by application of a solution of sodium bicarbonate. There results a crystalline precipitate which is filtered off and dried. The material obtained in this way is 1,3-dihydro-7-methyl-5-phenyl-2H-thieno[2,3-e]-1,4-diazepin-2-one which can be recrystallized from ethyl alcohol and benzene and which melts at 213° to 215°.

The aforesaid starting mayerial is obtainable by the following reaction:

6.7 g ω-cyanacetophenone are dissolved in 10 ml of dimethyl formamide and then reacted under continuous stirring with 1.5 g of sulphur and 6.4 ml of triethylamine. To this solution there are slowly added dropwise 3.4 ml of propionaldehyde in a manner such that the temperature does not exceed 50°. The solution prepared in this way is stirred for 1 hour more, thereafter poured on 100 ml of water and the separated oil is taken up in methylene chloride. The solution is rinsed with 2N hydrochloric acid, 2N caustic soda and water, then dried and vaporized. There remains a crystalline residue which is then boiled with a small portion of ether, then filtered in the cold and repeatedly washed by means of a small amount of ether. The product obtained in this way is then a very pure 2-amino-3-benzoyl-5-methyl-thiophene which may be submitted to the processing stapes pertaining to the following stages of the process without recrystallization. The yellow crystals, when recrystallized from ethyl alcohol, melt at 123° to 126°.

This 2-amino-3-benzoyl-5-methyl-thiophene in the amount of 5.5 g is dissolved in 50 ml of absolute dioxane and reacted, with 6 g of annealed potassium carbonate. Hereto, 8 ml of chloroacetyl chloride are introduced while the reaction mixture is continuously stirred. The resulting solution becomes a little warmer and is stirred during the next two hours, whereafter it is poured out into the solution of potassium carbonate. Then this mixture is left to stay for 3 hours, this giving rise to the precipitation of crystals which are filtered off, rinsed with water and dried. The resulting colorless 3-benzoyl-2-chloroacetylamino-5-methyl-thiophene melts, after recrystallization has been carried out from ethyl alcohol, at 132° to 134°. This crude product may be then introduced into the following processing step without being previously purified.

Thereafter, 7.45 g of the resulting 3-benzoyl-2-choroacetylamino-5-methyl-thiophene are boiled in 100 ml of acetone in mixture with 4.6 g of sodium iodide for 45 minutes under reflux conditions. The thus obtained mixture is vaporized under vacuum and the residue taken up in methylene chloride/water. Then, the organic phase is separated, dried and vaporized. There remains as a residue, colorless 3-benzoyl-2-iodoacetylamino-5-methyl-thiophene which, being recrystallized from ethyl alcohol, melts at 122° to 124°. The product may be introduced into the following stage of the process without being further purified.

Now, 9.7 g of the obtained 3-benzoyl-2-iodoacetylamino-5-methyl-thiophene are dissolved in 100 ml of liquid ammonia, whereafter the ammonia is vaporized under atmospheric pressure overnight. The crystalline residue is taken up by methylene chloride-water. The organic phase is separated, dried and vaporized. The colorless crystals are 2-aminoacetylamino-3-benzoyl-5-methylthiophene and melt, after being recrystallized from methylene chloride, at 114.5° to 115.5°.

EXAMPLE 17

1.21 g of 1,3-dihydro-5-phenyl-2H-thieno[3,2-e]-1,4-diazepin-2-one are dissolved in 5.1 ml of 1N methanolic sodium methylate solution, whereafter the resulting solution is vaporized to complete dryness and the crystalline residue is suspended in 7 ml of absolute dimethyl formamide. To this suspension is then added 0.58 ml of bromomethyl cyclopropane. The mixture is heated for 1 hour in a water bath, vaporized in vacuum, the residue being then shaken with diluted caustic soda and a bit of ether, and then washed through first with water and thereafter thoroughly with a little ether. The material obtained is 1-cyclopropylmethyl-1,3-dihydro-5-phenyl-2H-thieno[3,2-e]-1,4-diazepin-2-one which may be then recrystallized from cyclohexane and ethyl alcohol. It melts at 142° to 145°.

Example 18
Preparation of suppositories: per suppository
7-chloro-1,3-dihydro-5-phenyl-2H-thieno/2,3-e/-1,4-diazepin-2-one     0.010 g
cocoa butter/melting point 36°–37°                                    1.245 g
Carnauba-wax                                                          0.045 g
For one suppository weighing                                          1.300 g The cocoa butter and carnauba-wax are melted in a glass or steel vessel, then blended throughout and cooled to 45°. Then, there is added thereto finely pulverized 7-chloro-1,3-dihydro-5-phenyl-2H-thieno[2,3-e]1,4-diazepin-2-one and stirred until it is fully dispersed. The resulting mixture is then cast to suppository molds of the appropriate volume, the castings being then cooled, taken from their molds and individually packed in wax paper or metallic sheets.

Example 19
Production of capsules: per capsule
7-chloro-1,3-dihydro-5-phenyl-2H thieno[2,3-e]-1,4-diazepin-2-one     10 mg
Milk sugar                                                            165 mg
Indian corn starch                                                    30 mg
talcum                                                                5 mg
total                                                                 210 mg 7-chloro-1,3-dihydro-5-phenyl-2H-thieno[2,3-e]-1,4-diazepin-2-one, milk sugar and Indian corn starch are first blended together by means of a mixer and thereafter by a crushing device. The resulting mixture is then introduced once more into said mixer, whereafter talcum is added thereto and the whole mass is mixed once more. The finished mixture is then filled into hard gelatine capsules by a filling machine.

Example 20
Preparation of an injection solution: per ml
7-chloro-1,3-dihydro-5-phenyl-2H-thieno[2,3-e]-1,4-diazepin-2-one     5.0 mg
propylene glycol                                                      0.4 ml
benzyl alcohol (benzaldehyde-free)                                    0.015 ml
ethyl alcohol (95% concentrated)                                      0.10 ml
sodium benzoate                                                       48.8 mg
benzoic acid                                                          1.2 mg
water for injection q.s. to make                                      1.0 ml With the purpose of producing 10,000 ml of the above injection solution, 50 g of 7-chloro-1,3-dihydro-5-phenyl-2H-thieno[2,3-e]-1,4-diazepin-2-one are dissolved in 150 ml of benzyl-alcohol, addition being made to this solution of 4,000 ml of propylene glycol and of 1,000 ml of ethyl alcohol. Thereafter, 12 g of benzoic acid are dissolved in the mixture obtained in the aforesaid procedure and then a solution is added composed of 488 g. of sodium benzoate and 3,000 ml water (for injection purposes). There is obtained a solution to which is added water (for the purposes of injection) so that it attains the volume of 10,000 ml. Said solution is then filtered and filled into ampules of appropriate volume. The free volume of the ampule is filled up with nitrogen. The filled ampules are then sealed and sterilized for 30 minutes in autoclaves under a pressure of 0.7 atm.

What is claimed is:

1. A compound having the formula

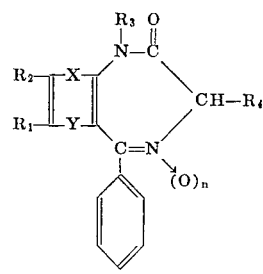

wherein one of X and Y is a direct carbon to carbon linkage and the other one is —S—, $n$ is 0 or 1, $R_1$ and $R_2$ are hydrogen, lower alkyl, halogen or nitro, $R_3$ is hydrogen, lower alkyl or cyclopropylmethyl and $R_4$ is hydrogen and pharmaceutically acceptable acid addition salts thereof.

2. A compound as claimed in claim 1 wherein $R_1$ is hydrogen.

3. A compound as claimed in claim 1 wherein $R_2$ is hydrogen, methyl, a nitro group or a halogen, the symbol X is —S— and Y is a direct linkage.

4. A compound as claimed in claim 3 wherein $R_2$ is chlorine.

5. A compound as claimed in claim 1 wherein $R_2$ is hydrogen or a nitro group, X is a direct linkage, and Y is —S—.

6. The compound according to claim 1 which is 1,3-dihydro-5-phenyl-2H-thieno[2,3-e]-1,4-diazepin-2-one.

7. The compound according to claim 1 which is 7-chloro-1,3-dihydro-5-phenyl-2H-thieno-[2,3-e]-1,4-diazepin-2-one.

8. The compound according to claim 1 which is 1,3-dihydro-5-phenyl-2H-thieno-[3,2-e]-1,4-diazepin-2-one.

9. The compound according to claim 1 which is 1,3-dihydro-7-nitro-5-phenyl-2H-thieno-[2,3-e]-1,4-diazepin-2-one.

10. The compound according to claim 1 which is 1,3-dihydro-8-nitro-5-phenyl-2H-thieno-[3,2-e]-1,4-diazepin-2-one.

11. The compound according to claim 1 which is 1,3-dihydro-1-methyl-7-nitro-5-phenyl-2H-thieno-[2,3-e]-1,4-diazepin-2-one.

12. The compound according to claim 1 which is 1,3-dihydro-1-methyl-5-phenyl-2H-thieno-[2,3-e]-1,4-diazepin-2-one.

13. The compound according to claim 1 which is 7-chloro-1,3-dihydro-1-methyl-5-phenyl-2H-thieno-[2,3-e]-1,4-diazepin-2-one.

14. The compound according to claim 1 which is 1,3-dichloro-1-methyl-5-phenyl-2H-thieno-[3,2-e]-1,4-diazepin-2-one.

15. The compound according to claim 1 which is 1,3-dihydro-1-methyl-8-nitro-5-phenyl-2H-thieno-[3,2-e]-1,4-diazepin-2-one.

16. The compound according to claim 1 which is 1,3-dihydro-5-phenyl-2H-thieno-[2,3-e]-1,4-diazepin-2-one-4-oxide.

17. The compound according to claim 1 which is 1,3-dihydro-5-phenyl-2H-thieno-[3,2-e]-1,4-diazepin-2-one-4-oxide.

18. The compound according to claim 1 which is 1,3-dihydro-7-methyl-5-phenyl-2H-thieno-[2,3-e]-1,4-diazepin-2-one.

19. The compound according to claim 1 which is 1-cyclopropylmethyl-1,3-dihydro-5-phenyl-2H-thieno-[3,2-e]-1,4-diazepin-2-one.

* * * * *